United States Patent [19]

Frykhult

[11] 4,441,999

[45] Apr. 10, 1984

[54] STRAINER MEANS FOR PULP PURIFICATION

[75] Inventor: Rune H. Frykhult, Huddinge, Sweden

[73] Assignee: AB Celleco, Stockholm, Sweden

[21] Appl. No.: 228,569

[22] Filed: Jan. 26, 1981

[30] Foreign Application Priority Data

Jan. 28, 1980 [SE] Sweden .................................. 8000651

[51] Int. Cl.³ .............................................. B01D 33/06
[52] U.S. Cl. ..................................... 210/354; 210/402
[58] Field of Search ......................... 210/354, 402–404

[56] References Cited

U.S. PATENT DOCUMENTS 3,278,039 10/1966 Nilsson .............................. 210/403
3,448,858 6/1969 Delcellier et al. ............... 210/354 X
4,108,778 8/1978 Lambert et al. ................ 210/354 X

*Primary Examiner*—Thomas G. Wyse
*Attorney, Agent, or Firm*—Cyrus S. Hapgood

[57] ABSTRACT

A strainer device for purification of pulp suspensions comprises a strainer drum with a cylindrical mantle provided with strainer openings. Between the strainer openings are inclined surfaces forming an angle with the flow direction of the suspension, in order that particles contacting the surfaces are given a component of movement radially outwards.

10 Claims, 6 Drawing Figures

U.S. Patent  Apr. 10, 1984  4,441,999
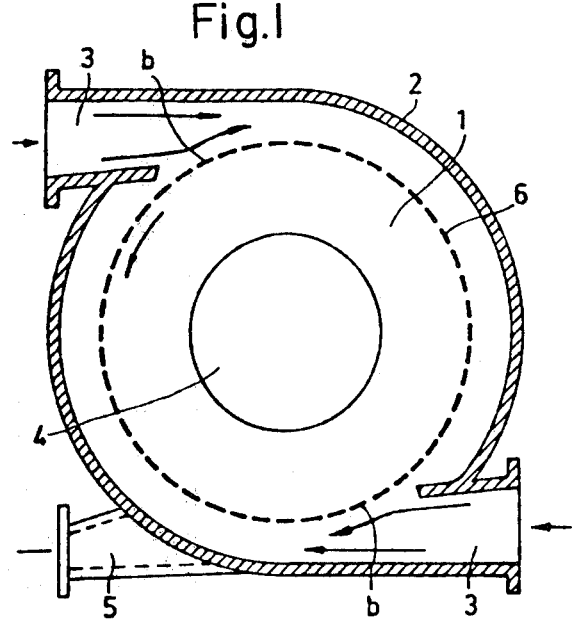
Fig.1
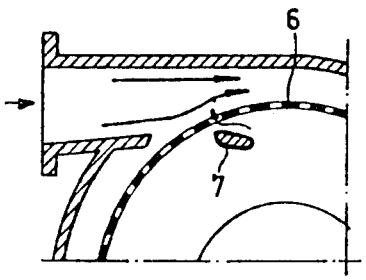
Fig.4
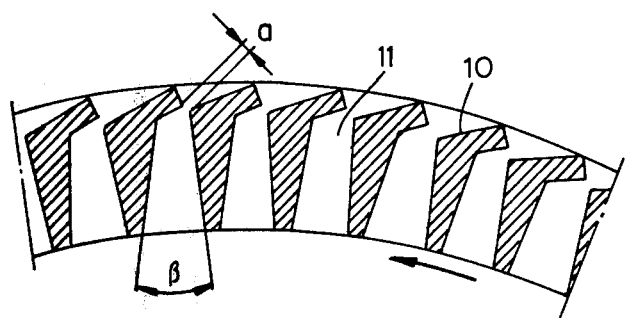
Fig.2
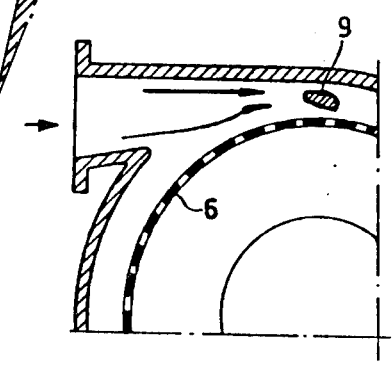
Fig.5
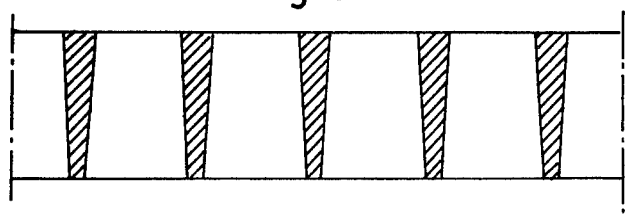
Fig.3
Fig.6

STRAINER MEANS FOR PULP PURIFICATION

The present invention relates to a device for straining pulp and comprising a strainer drum with a substantially circular cylindrical mantle provided with strainer openings.

Strainers of a variety of shapes are used extensively for purification of pulp in the cellulose and paper industry.

Most strainers include a stationary strainer drum with a circular transverse section and are provided with two or more rotating, inclined wings which are moved in the vicinity of the strainer mantle of the drum. These wings (so-called "foils") have hitherto been absolutely necessary in normal applications in order to prevent the strainer openings from being plugged by the pulp. These wings operate by providing pressure impulses or alternate pressure releases, which serve to push or pull out pulp plugs blocking the strainer openings. Some strainers have wings arranged to give a pressure impulse from the discharge side of the strainer element. Other strainer types have wings arranged to give a pressure release on the feed side of the strainer element (seen in the direction of the flow passing through the strainer element), which in this case will give a suction of said pulp plugs.

Regardless of the type of wings used, they have one great disadvantage in common. These pressure impulses are transmitted to the system beyond the strainer, for instance to the feed box of a paper machine, which in turn will mean a varying thickness of the paper due to a varying feed of paper pulp.

By means of a device according to the present invention, the problem of pressure variations has been avoided in that the wings have been eliminated, that is, their function has been incorporated within the strainer element in itself.

The device according to the invention is characterized in that the mantle is provided between the strainer openings with surfaces which are inclined in relation to the circumferential direction of the mantle and which form an attack angle against the flow direction of the suspension, so that particles contacting said surfaces are given a component of movement directed radially outwards.

The invention will now be disclosed more in detail, reference being made to the accompanying drawing in which FIG. 1 is a transverse sectional view of a strainer device according to the invention;

FIGS. 2 and 3 are transverse and longitudinal sectional views, respectively, of a part of a strainer mantle (strainer element); and FIGS. 4, 5 and 6 are transverse sectional views of modifications of the device in FIG. 1.

In the drawing, a strainer drum 1 is provided in a strainer housing 2 having inlets 3 for the pulp to be purified, outlets 4 for purified pulp, and outlets 5 for the reject. The strainer drum 1 is provided with a strainer mantle or a strainer element 6.

The inlets 3 of the strainer are arranged in such a manner that at least part of the inject flow will hit the strainer mantle 6, which moves in an opposite direction to that of the inject flow.

The strainer mantle in FIG. 2 is designed with inclined surfaces 10 arranged peripherally between the strainer openings. The surfaces 10 have their largest extension radially in the bottom end, as seen in the flow direction of the liquid feed stream, which means that particles contacting the strainer mantle are given a component of movement directed radially outwards.

Strainer openings 11 are provided behind said surfaces 10, as seen in the direction of flow of the liquid stream, and thus "on the lee side" of said surfaces 10, the smallest flow area of the openings 11 being at the inlet end of them ("a" in the drawing denotes the smallest flow area). The flow area of the strainer openings widens thereafter successively in the flow direction through the openings (the angle $\beta$ is $>0°$).

In the operation of the device, the inclined surfaces 10 between the strainer openings give the heavier particles contacting the strainer mantle a component of movement directed outwards, thereby preventing the particles from accompanying the flow through the strainer openings.

In the feed zone where the incoming flow hits the strainer drum (at b) and thus the surfaces 10, the liquid flow is caused to change its direction of movement so that there will be created a lower pressure behind said surfaces 10, as seen in the direction of movement. This lower pressure will suck any pulp plugs from the openings 11 as they pass each inlet 3. In some cases, it will be possible to achieve a higher capacity of flow by providing two or more inlets 3, the strainer mantle 6 being cleaned more times per revolution of drum 1.

Regardless of the number of inlets 3, the operation will be absolutely free from variations of the pressure in the system beyond the strainer, which has been confirmed by test runs.

Surprisingly, the result of these test runs has shown that it is possible to work continuously with pulp concentrations up to 5-6% (weight) without any plugging. Also, the flow capacity has been shown to be surprisingly high as compared to conventional strainers. It is believed that this depends upon the fact that the new device allows the use of larger flow areas in the strainer.

A further advantage is that the cost of manufacture is lower, partly of course due to the absence of wings, but also because the demand on tolerances is of minor importance. Small divergences from a circular form of the drum are of no influence. When wings are used, the distance between the drum and the wings must be quite small and of constant size, which of course means that the machining must be accurate.

In modifications of the invention, the strainer is supplemented with one or more stationary inner wings 7 (FIG. 4) or with one or more outer wings 8 (FIG. 5). By causing the strainer element according to the invention to cooperate with the wings used formerly, the prevention of plugging of the strainer can be further improved. With inner wings 7, at least one is preferably arranged in the inlet zone in order to combine the effect of plugging prevention of both systems. With an outer stationary wing 8, this can be located in the inlet zone in the rotation direction of the drum immediately after or integrated with the inlet opening (FIG. 5). There are no pressure variations in the system beyond the strainer in spite of the presence of wings, as they are stationary.

In another modification, the drum is arranged stationary while the wings are rotated, one of these wings being shown at 9 in FIG. 6. Alternatively, both the drum and the wings are rotated.

The advantage of combining a strainer according to the invention with wings, as compared with conventional strainers with wings, is that the inherent effect of keeping the strainer drum open allows the wings to be designed for a much weaker pressure impulse effect. This embodiment can in some cases be suitable in order to enable straining at higher pulp concentrations than could previously be handled by strainers.

I claim:

1. In a device for straining pulp, the combination of a housing having an inlet for a suspension, a strainer drum located within the housing and having a substantially circular cylindrical mantle provided with strainer openings, the mantle having between said openings slanting external surfaces which are inclined in relation to the circumferential direction of the mantle, said surfaces forming an attack angle against the flow direction of said suspension from the inlet, the inclination of said surfaces acting to give particles issuing from said inlet and contacting said surfaces a component of movement directed radially outward, the two slanting external surfaces adjacent each strainer opening lying in different planes.

2. The combination of claim 1, in which each strainer opening has a relatively small inlet flow area, said area widening successively in the flow direction through the mantle.

3. The combination of claim 1, in which said inlet is arranged to direct at least part of said suspension against the mantle.

4. The combination of claim 3, in which the housing has at least one additional inlet for a suspension, said additional inlet being arranged to direct against the mantle at least part of the suspension passing through the additional inlet.

5. The combination of claim 1, in which the strainer drum is rotatable and driven to move its periphery in the direction opposite to said flow direction of the suspension from said inlet.

6. The combination of claim 1, comprising also at least one wing located in the strainer drum and operable to provide a pressure change coacting with said inclined surfaces to preventing plugging of the strainer openings.

7. The combination of claim 1, comprising also at least one stationary wing located within the housing but outside the strainer drum, said wing coacting with said inclined surfaces to preventing clogging of the strainer openings.

8. The combination of claim 7, in which the strainer drum is rotatable, said wing being located in the region of said inlet but beyond said inlet in the direction of rotation of the drum.

9. The combination of claim 1, comprising also at least one rotatable wing located within the strainer drum and coacting with said inclined surfaces to prevent plugging of the strainer openings, the strainer drum being stationary.

10. The combination of claim 1, comprising also at least one rotatable wing located within the housing but outside the strainer drum and coacting with said inclined surfaces to prevent plugging of the strainer openings, the strainer drum being stationary.

* * * * *